US008170745B1

(12) United States Patent  (10) Patent No.: US 8,170,745 B1
Lors  (45) Date of Patent: May 1, 2012

(54) SEAT OCCUPANCY VERIFICATION SYSTEM FOR MOTOR VEHICLES

(76) Inventor: Jean-Pierre Lors, Brooklyn, NY (US)

(*) Notice: Subject to any disclaimer, the term of this patent is extended or adjusted under 35 U.S.C. 154(b) by 746 days.

(21) Appl. No.: 12/283,068

(22) Filed: Sep. 9, 2008

Related U.S. Application Data

(60) Provisional application No. 60/967,982, filed on Sep. 10, 2007.

(51) Int. Cl.
*G08B 21/22* (2006.01)
(52) U.S. Cl. .......... 701/36; 340/5.81; 340/433; 340/667
(58) Field of Classification Search .......... 701/1, 36; 340/5.8–5.82, 426.24, 426.25, 433, 666, 340/667; 180/271, 272; 235/380
See application file for complete search history.

(56) References Cited

U.S. PATENT DOCUMENTS

| | | | |
|---|---|---|---|
| 7,039,514 B2 | 5/2006 | Fortune | |
| 7,055,639 B2 | 6/2006 | Kiribayashi | |
| 7,075,450 B2 | 7/2006 | Young et al. | |
| 7,082,360 B2 | 7/2006 | Oestreicher et al. | |
| 7,091,873 B2 | 8/2006 | Bauer et al. | |
| 7,135,983 B2 | 11/2006 | Fillipov et al. | |
| 7,151,452 B2 | 12/2006 | Shieh | |
| 7,205,902 B2 * | 4/2007 | Kiribayashi | 340/667 |
| 2009/0055180 A1 * | 2/2009 | Coon et al. | 704/251 |

* cited by examiner

*Primary Examiner* — Paul N Dickson
*Assistant Examiner* — Timothy Wilhelm
(74) *Attorney, Agent, or Firm* — Montgomery Patent & Design, LLC; Robert C. Montgomery; Joseph T. Yaksich

(57) ABSTRACT

A system and methodology utilizing seat sensors and an electronic card system that monitors the location of children on a bus as well as preventing children from being left behind, is herein disclosed. As the child enters the bus, the child would insert a personalized identification card, thereby recording the child's seat location and presence. Upon exiting, the child again inserts the identification card and following a prescribed time interval, a warning light and alarm would be activated if the seat remains occupied, thus alerting the bus driver to check the seat location. Every bus seat would have an integral weight sensor electrically connected to a main control panel. The system provides the bus driver, or assigned chaperone, a pushbutton selection array corresponding to each seat assignment.

16 Claims, 4 Drawing Sheets

SEAT OCCUPANCY VERIFICATION SYSTEM FOR MOTOR VEHICLES

RELATED APPLICATIONS

The present invention was first described in and claims the benefit of U.S. Provisional Patent Application No. 60/967,982 filed on Sep. 10, 2007, the entire disclosures of which are incorporated herein by reference.

FIELD OF THE INVENTION

The present invention relates generally to a tobacco product filtration device and, more particularly, to said device reducing second hand smoke.

BACKGROUND OF THE INVENTION

There are many situations where children require transportation on multiple passenger vehicles. Field trips and transportation to school require a school bus. Some children are transported in large multiple passenger vans. Airplanes, commercial buses, trains all create situations where children can be easily displaced or forgotten about due to other pressures on a vehicle operator. When children are overlooked in conveyances of this sort, it may have dreadful consequences. Children have died from being left in overheated vehicles. Accordingly, there exists a need for a means by which the presence of a child on a multiple passenger vehicle can be more readily and easily detected. The development of the invention herein described fulfills this need.

It is all too often that we hear on the news of a child is left behind a school bus after a school day. Most of the time, the child is found at the school bus yard storage facility and the story ends happily. However in some cases, such as in inclement weather, weekends, or when a parent thinks the child is with someone else, the event can end tragically with a child's death. The causes of such oversight are many and may include new bus drivers, substitute bus drivers, or more likely, a child that has simply fallen asleep. Even with a required walk through after the bus run, children are sometimes simply overlooked. The development of the invention herein described fulfils this need.

U.S. Pat. No. 7,151,452 issued to Shieh discloses a vehicle occupant sensing system comprising a sensing system to determine if a child is within a motor vehicle. Unfortunately, this patent does not appear to disclose an apparatus and method the uses a unique identifier card issued to school children to monitor a child's presence on a school bus nor does this patent appear to disclose the use of a plurality of sensors located in the seats of a multiple passenger vehicle that electronically communicate with a main control cabinet.

U.S. Pat. No. 7,135,983 issued to Filppov et al discloses an occupant presence detection device that is able to detect whether a person is seated and occupying a motor vehicle, restaurant seat or the like. Unfortunately, this patent does not appear to disclose a main control cabinet that is pivotally adjustable adjacent to an operator nor does it appear to disclose the use of unique identifier cards issued to passengers that are read by a reader on the main control cabinet.

U.S. Pat. No. 7,091,873 issued to Bauer et al. discloses a device and method for detecting the occupation of a seat in a motor vehicle comprising a sensor analyzer and a detector analyzer. Unfortunately, this patent does not appear to a system that utilizes unique identifier cards issued to passengers to determine their presence in an assigned seat on a vehicle nor does this patent appear to disclose a system capable of wireless control and monitoring.

U.S. Pat. No. 7,082,360 issued to Oestreicher et al discloses a method and system for determining weight and position of a vehicle seat occupant for use in controlling a restraint system in a motor vehicle. Unfortunately, this patent does not appear to disclose a disclose an apparatus and method the uses a unique identifier card issued to school children to monitor a child's presence on a school bus nor does this patent appear to disclose the use of a plurality of sensors located in the seats of a multiple passenger vehicle that electronically communicate with a main control cabinet.

U.S. Pat. No. 7,075,450 issued to Young and Nathan discloses a vehicle occupant sensing system having discrete wiring comprising a controller and at least one sensor assembly. Unfortunately, this patent does not appear to disclose an apparatus that is utilized to detect the presence of a child on a multiple passenger vehicle and that is capable of alerting responsible individuals of that situation.

U.S. Pat. No. 7,055,639 issued to Kiribaynashi discloses an occupant detection system for vehicles comprising a seat occupancy sensor that interacts with an air bag electrical control unit. Unfortunately, this patent does not appear to a system that utilizes unique identifier cards issued to passengers to determine their presence in an assigned seat on a vehicle nor does this patent appear to disclose a system capable of wireless control and monitoring.

U.S. Pat. No. 7,039,514 issued to Fortune discloses an occupant classification method based on seated weight measurement for purposes of air bag suppression. Unfortunately, this patent does not appear to disclose a sensing system for children capable of detecting the presence of a child on a multiple passenger vehicle and that further alerts individuals to the unattended child nor does it appear that this system is capable of wireless control and monitoring via an external antenna.

SUMMARY OF THE INVENTION

In view of the foregoing disadvantages inherent in the prior art, it has been observed that there is a need for a seat occupancy verification system for motor vehicles which monitors occupancy of seated children on school buses or other multi-passenger vehicles utilizing seat sensors and an electronic card system.

An object of the seat occupancy verification system is to verify that a child is not left unattended on a multi-passenger vehicle.

Another object of the seat occupancy verification system is to verify the location of a child on a multi-passenger vehicle by providing each child with an identification (ID) card that the child inserts into the main control cabinet on entry and egress of a multiple passenger vehicle, such as a school bus. Discrepancies in any child's location activate an indicator light and alarm alerting the bus operator to check a corresponding seat location.

A further object of the seat occupancy verification system is to verify that each child is in the seat assigned to that child by displaying this information to an operator on an attached display screen.

Yet a further object of the seat occupancy verification system is that the system may be used aboard multi-passenger vehicles. The system may also be used aboard other vehicles such as commercial busses, tour busses, airplanes, and ferry boats with equal benefits and results.

Yet another object of the seat occupancy verification system provides a main control cabinet that is located adjacent to an operator so that the main control cabinet is easily visible and physically accessible to the operator.

Another object of the seat occupancy verification system is that the system receives electric power from an onboard electrical system of the multi-passenger vehicle.

Yet a further object of the seat occupancy verification system is that the system comprises an external antenna connected to the main control cabinet that provides wireless remote access to the system.

Still a further object of the seat occupancy verification system is a quick-release mechanism that permits the main control cabinet to be rotationally pivoted by an operator to a desired position.

Yet still another object of the seat occupancy system is that the quick-release mechanism further permits the main control cabinet to be easily removed and placed in another vehicle or in another location if so desired.

Still another object of the seat occupancy system is that the electrical connections to the main control cabinet may be easily connected or disconnected through the use of dedicated connectors so that the main control cabinet may be easily disconnected form the system.

An aspect of the seat occupancy verification system comprises a main control cabinet, a plurality of sensors, a pedestal, interconnected cabling, power cabling, transmitter cabling, and an antenna.

Another aspect of the seat occupancy verification system comprises a main control cabinet further comprising a metallic rectangular control center; a mimic panel and a plurality of seat number labels corresponding directly to a particular arrangement of passenger seats and passenger locations; a card reader, an acknowledgement indicator light, a denial indicator light, and an alarm verifying seating eligibility upon conformation with an internal computerized database; a mounting post, and a plurality of fasteners, wherein the pedestal provides a conduit through which the power cable, transmitter cable, and interconnecting cables pass and are subsequently routed to the main control cabinet; and wherein the pedestal is supported and affixed to a floor surface adjacent to the operator of the multi-passenger vehicle.

User interface with the system is provided via a keyboard and electronic display screen. Power is routed via a power cable to a microprocessor such as a basic stamp controller, a programmable logic controller, a personal computer, or other similar device capable of executing various commands dependent upon certain inputs.

Yet another aspect of the seat occupancy verification system comprises a quick release mechanism. The quick-release mechanism comprises a plurality of fasteners, a locking pin, a release handle, a plurality of locking apertures, and a retaining spring.

A further aspect of the seat occupancy verification system comprises a power cable, a transmitter cable, interconnected cabling, an extension cable, a first connector, and a second connector. The power cable, transmitter cable, and interconnecting cabling are routed through the pedestal, being attached and combined to a first connector.

Yet another aspect of the seat occupancy verification system comprises a first connector, a second connector, and an extension cable that provide convenient electrical connection and disconnection of the main control cabinet to the system, thereby allowing removal of the control cabinet from the system.

Yet another aspect of the seat occupancy verification system comprises a plurality of seat sensors positioned on an underside portion of each passenger seat, providing indication to the main control cabinet that a person is present in a respective seat. The seat sensors preferably comprise common mechanical-type contact closure devices similar to those utilized in many automobile systems, although other types of mechanical and electronic switches and sensors may be provided such as, transducers, heat sensing, and ultrasonic, that provide equal benefit and function.

A further aspect of the seat occupancy verification system comprises sensors that provide various "closed" and "open" signals routed through the interconnecting cabling and collected by a signal shaping circuit which take said signals and convert them to a suitable resultant signal that can be used by the microprocessor. Additional input signals are provided from a keyboard to the microprocessor. In a similar manner, output signals are provided from the microprocessor to the electronic display screen. Output signals are also provided from the microprocessor to a light driver circuit which controls the application of power to the array of indicator lights. A number and arrangement of seat sensors would match that of the indicator lights for any one particular multi-passenger vehicle. An output signal is provided from the microprocessor to the acknowledgment indicator light, denial indicator light, and buzzer as well. An input signal is provided from the card reader to the microprocessor. Finally, a bi-directional communication path carries electrical signals between the microprocessor and transceiver modem.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
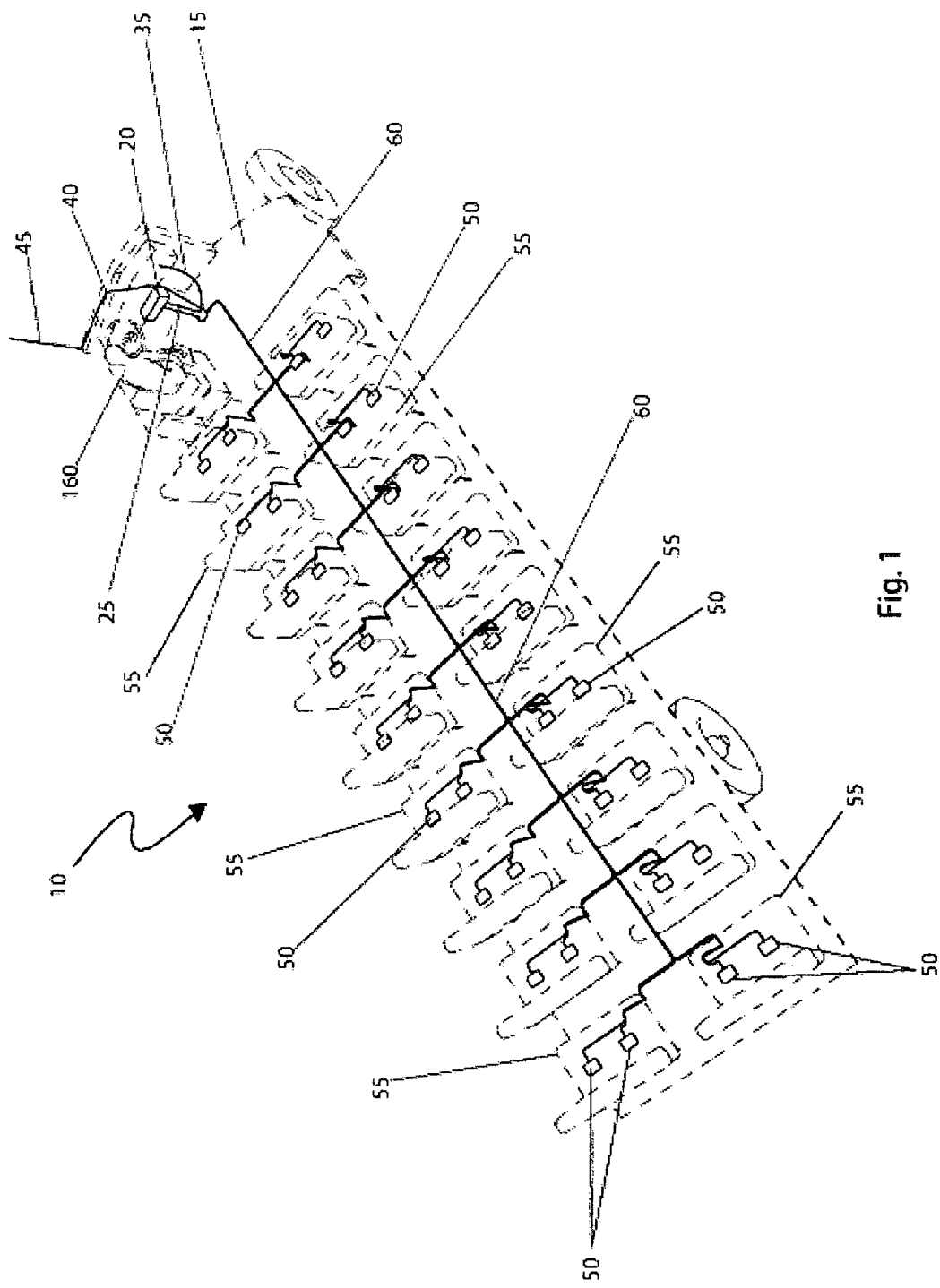
FIG. 1 is an overall perspective view of the seat occupancy verification system for motor vehicles 10 depicting a utilized state, according to the preferred embodiment of the present invention.

| | DESCRIPTIVE KEY |
|---|---|
| 10 | seat occupancy verification system |
| 15 | multi-passenger vehicle |
| 20 | main control cabinet |
| 21 | mounting post |
| 22 | fastener |
| 23 | locking aperture |
| 25 | pedestal |
| 26 | quick-release mechanism |
| 27 | locking pin |
| 28 | retaining spring |
| 29 | release handle |
| 30 | first connector |
| 31 | second connector |
| 32 | extension cable |
| 35 | power cable |
| 40 | transmitter cable |
| 45 | antenna |
| 46 | alarm |

-continued

DESCRIPTIVE KEY

| | |
|---|---|
| 50 | sensor |
| 55 | passenger seat |
| 60 | interconnecting cabling |
| 65 | mimic panel |
| 70 | indicator lights |
| 75 | seat number labels |
| 80 | card reader |
| 82 | identification (ID) card |
| 85 | acknowledgment indicator light |
| 90 | denial indicator light |
| 95 | ON/OFF switch |
| 100 | keyboard |
| 105 | display screen |
| 110 | mounting plate |
| 120 | battery |
| 125 | over current device |
| 130 | microprocessor |
| 135 | signal shaping circuit |
| 140 | light driver circuit |
| 145 | bi-directional communication path |
| 150 | transceiver modem |
| 160 | operator |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system and method for a seat occupancy verification system for motor vehicles (herein described as the "system") 10, which monitors occupancy of seated children on school buses or other multi-passenger vehicles 15 by utilizing seat sensors 50 and an electronic card system 80. Upon entering a bus 15, each child provides an ID card 82 which is inserted thereinto a control cabinet 20. In like manner, the ID card 82 is again inserted as the child exits the bus 15, thereby accounting for a location of each child. Discrepancies in any child's location activates an indicator light 90 and an alarm 46 alerting the bus operator 160 to check a corresponding seat location 55. Each sensor 50 is connected to a control cabinet 20 which provides an operator 160, or assigned chaperone, displayed information for each seat assignment upon a display screen 105.

Referring now to FIG. 1, an overall perspective view of the system 10 depicting a utilized state, according to the preferred embodiment of the present invention is disclosed. The system 10 is used aboard a multi-passenger vehicle 15, depicted here as a school bus having the roof cut away for purposes of illustration; however, it should be noted that other vehicles such as commercial busses, tour busses, airplanes, ferry boats, other multi-passenger vehicles, and the like, can be used with equal benefits and results, and as such, should not be interpreted as a limiting factor of the present invention. A main control cabinet 20 is located upon a floor-mounted pedestal 25 adjacent thereto an operator 160 of said multi-passenger vehicle 15, thereby being easily visible and physically accessible. The main control cabinet 20 receives electric power therefrom a power cable 35 being connected thereto an onboard electrical system of the multi-passenger vehicle 15. A transmitter cable 40 connects the control cabinet 20 to an external antenna 45 providing wireless remote access thereto the system 10 by others as needed. The system 10 comprises a plurality of seat sensors 50 on an underside portion of each passenger seat 55. The sensors 50 are electrically interconnected to the main control cabinet 20 by a plurality of interconnecting cables 60 routed discreetly within a floor surface of the multi-passenger vehicle 15. Said power cable 35, transmitter cable 40, and interconnecting cables 60, are subsequently routed therewithin a pedestal portion 25 and thereinto the control cabinet 20. In such a manner, each passenger seat 55 provides indication to the main control cabinet 20 that a person is present in a respective seat 55 (see FIGS. 2 and 3).

Figure 2:
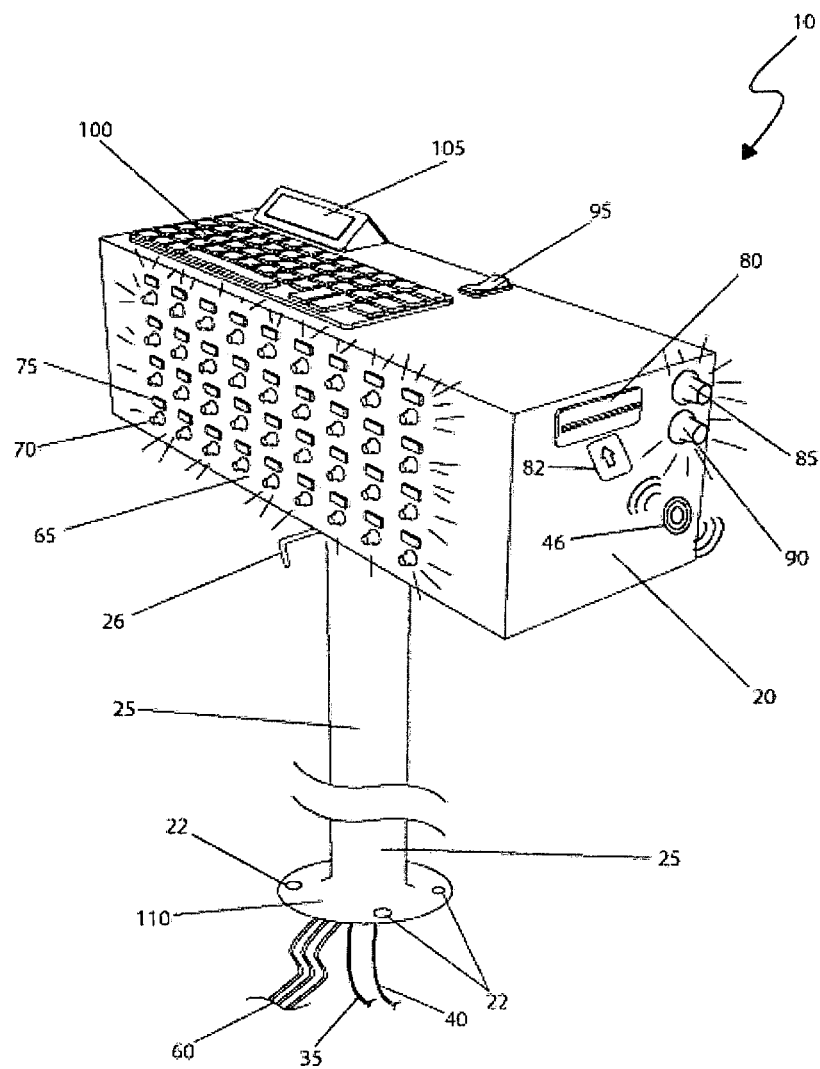
FIG. 2 is a front perspective view of a quick-release mechanism 26, according to a preferred embodiment of the invention.

Referring next to FIG. 2, a front perspective view of a main control cabinet portion 20 of the system 10, according to a preferred embodiment of the invention, is disclosed. The main control cabinet 20 comprises a metallic rectangular control center approximately twenty-four (24) inches wide, twelve (12) inches high, and twelve (12) inches deep. The control cabinet 20 contains a forward facing mimic panel 65 comprising a plurality of indicator lights 70 and associated seat number labels 75 which correspond directly thereto a particular arrangement of passenger seats 55 and passenger locations on the multi-passenger vehicle 15. A card reader 80 is provided on a side panel portion of the main control cabinet 20 such that an entering passenger to the multi-passenger vehicle 15 inserts a corresponding electronic ID card 82 verifying his or her identity and associated seat assignment. An acknowledgment indicator light 85, a denial indicator light 90, and the alarm 46 verifies seating eligibility upon conformation with an internal computerized database. Power thereto the system 10 is controlled by an ON/OFF switch 95. Finally, user interface with the system 10 is provided via a keyboard 100 and electronic display screen 105. As previously mentioned, the main control cabinet 20 is supported and affixed thereto a floor surface of the multi-passenger vehicle 15 by a pedestal 25 further comprising a mounting plate 110 and a plurality of common threaded anchoring fasteners 22. The main control cabinet 20 is joined to the pedestal 25 using a quick-release mechanism 26 that allows the main control cabinet 20 to pivot as well as be moved from one multi-passenger vehicle 15 to another as needs require (see FIG. 3).

Figure 3:
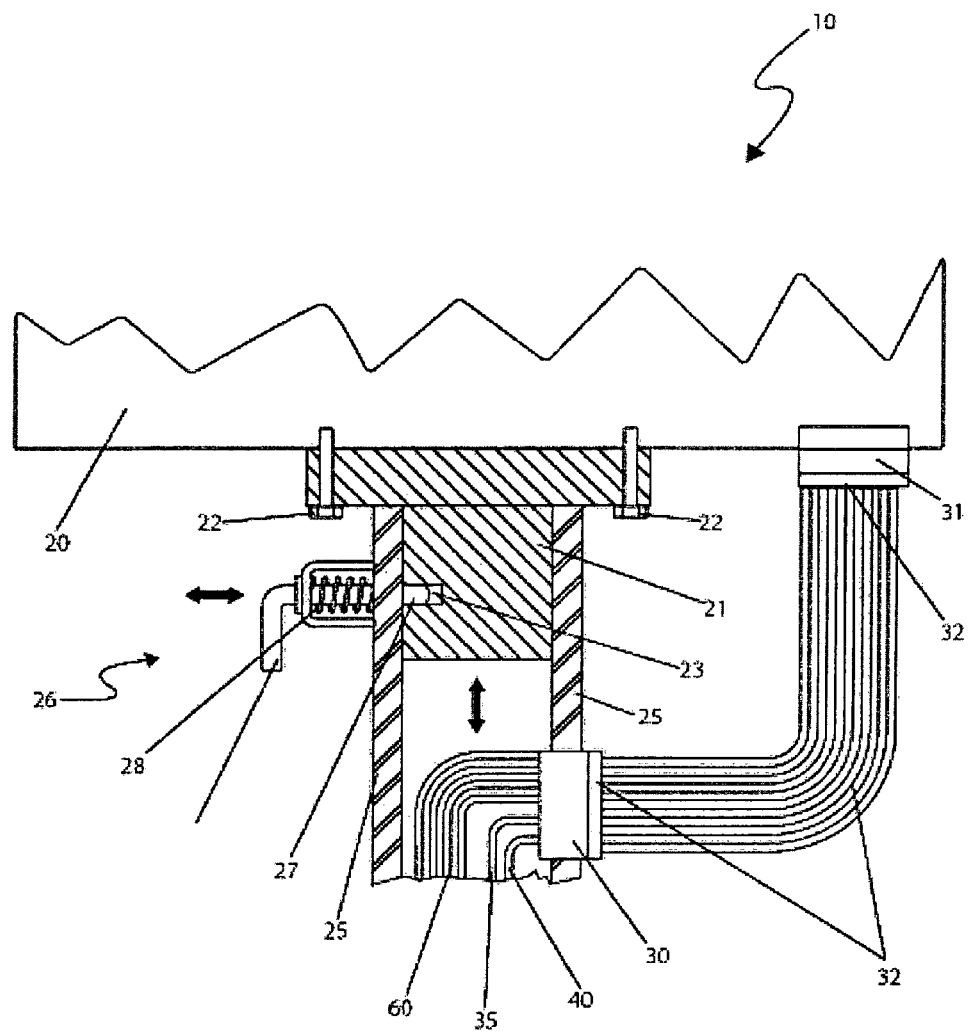
FIG. 3 is a section view of a main control cabinet portion 20 of a seat occupancy verification system for motor vehicles 10, according to a preferred embodiment of the invention; and, FIG. 4 is an electrical block schematic diagram that depicts the electrical components as used in the seat occupancy verification system for motor vehicles 10, according to a preferred embodiment of the invention.

Referring now to FIG. 3, a section view of a quick-release mechanism portion 26 of the system 10, according to a preferred embodiment of the invention, is disclosed. The quick-release mechanism 26 comprises a securing assembly made using rugged machined or cast metal parts providing a mounting and orientation means thereto the control cabinet 20 as well as a detachment means therefrom the pedestal 25. The quick-release mechanism 26 comprises a mounting post 21, a plurality of fasteners 22, a locking pin 27, and a release handle 29. The control cabinet 20 provides an attachment means thereto the mounting post 21 along a bottom horizontal surface using a plurality of common fasteners 22 such as bolts, screws, or the like. The mounting post 21 comprises a "T"-shaped cylindrical fixture having an upper supporting flange and a main vertical diameter suitable for insertion thereinto an interior diameter of the pedestal 25. Said flange portion of the mounting post 21 provides a plurality of equally-spaced drilled holes therearound, thereby utilizing a normal threaded attachment thereto said control cabinet 20 using corresponding fasteners 22 in an expected manner. Insertion of the mounting post 21 thereinto a top opening of the pedestal 25 provides rotational positioning of the control cabinet 20, thereby providing an operator 160 an effective selectable viewing angle. The quick-release mechanism 26 provides a means of locking said control cabinet 20 thereinto a desired orientation via a locking pin 27, corresponding locking apertures 23, and a release handle 29. The locking pin 27 provides an inserting round pin which slidingly passes horizontally thereinto a drilled hole in the pedestal 25 and subsequently thereinto a particular locking aperture 23 located therein the mounting post 21. The locking pin 27 further comprises a retaining spring 28 and an "L"-shaped handle 29. In use, the handle 29 is manually pulled away from the pedestal 25, thereby compressing the spring 28 and releasing the locking pin 27 therefrom a respective locking aperture 23, thereby allowing re-orientation or if lifted in an upward direction, removal thereof the control cabinet 20 therefrom the pedestal 25. The locking apertures 23 comprise a plurality of equally-spaced drilled holes approximately one (1) inch deep and arranged in a radial manner therearound the mounting post 21, thereby enabling an operator 160 to select and secure a desired orientation of the control cabinet 20.

Convenient electrical connection and disconnection of the control cabinet 20 therefrom the system 10 is also provided via a first connector 30, a second connector 31, and an extension cable 32. The first connector 30, a second connector 31, and an extension cable 32 comprise commercially available electrical components providing a linear molding of multiple conductors and expected matching pairs of male and female plastic end fittings providing a rugged connection and disconnection means, thereby allowing removal of the control cabinet 20 therefrom the system 10. As previously described, the power cable 35, transmitter cable 40, and interconnecting cabling 60 are routed therethrough the pedestal 25, being attached and combined thereto the first connector 30. The first connector 30 is mounted along an outer wall portion of the pedestal 25 subjacent thereto the quick-release mechanism 26. Said first connector 30 provides a penetration means therethrough a wall portion of the pedestal 25. The first connector 30 provides a female fitting portion along an external surface of the pedestal 25 providing standard electrical attachment thereto a proximal end portion of the extension cable 32. Said extension cable 32 comprises an approximately eighteen (18) inch long section of multi-conductor cable having mating end fittings providing expected electrical attachment thereto the first 30 and second 31 connectors at proximal and distal end portions, respectively. The second connector 31 provides a standard panel-mount attachment means thereto a bottom surface of the control cabinet 20 (see FIG. 4).

Figure 4:
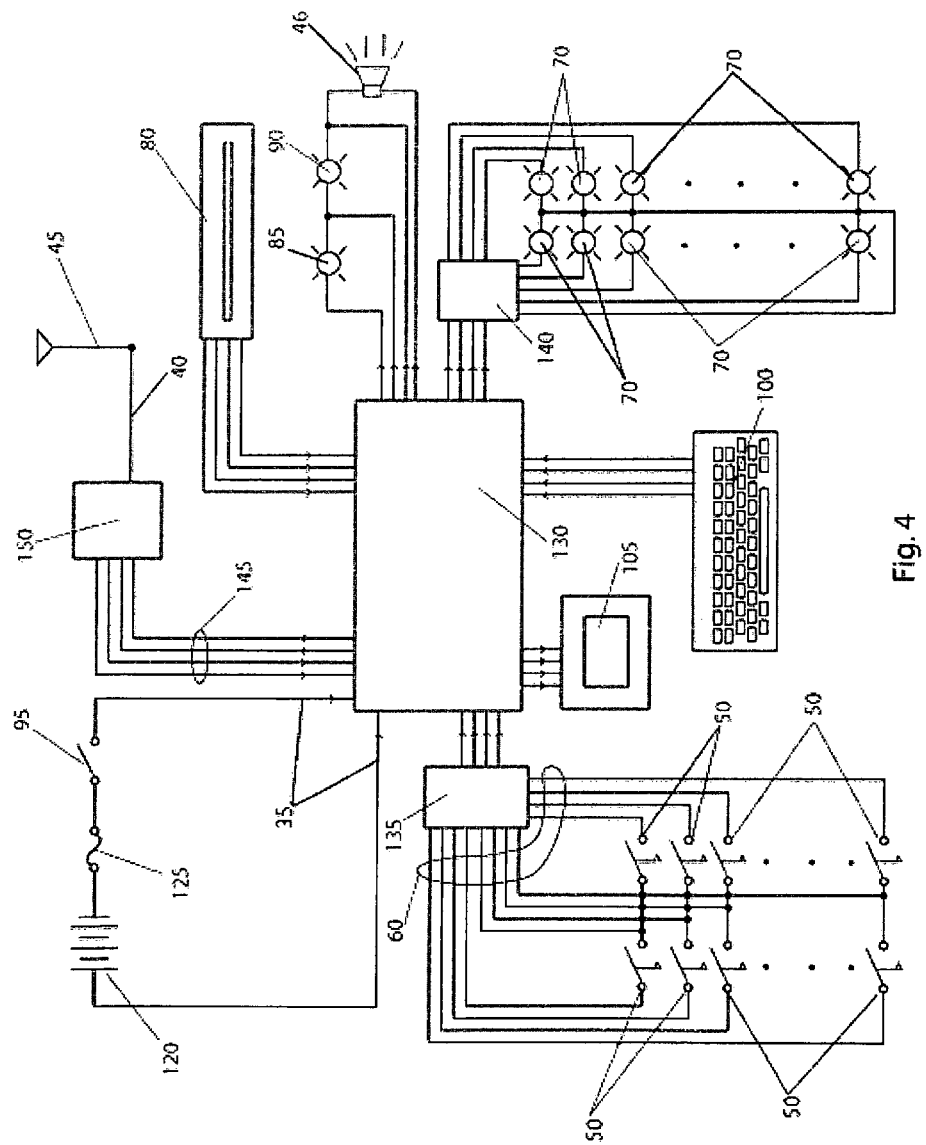

Referring finally to FIG. 4, an electrical block schematic diagram which depicts the electrical components as used in the system 10, according to a preferred embodiment of the invention is disclosed. Main power is provided via a battery 120 portion of an electrical system of the multi-passenger vehicle 15. Said power is then routed through an over current device 125 such as a fuse, whereupon it is be controlled by an ON/OFF switch 95. Power is then routed via a power cable 35 thereto a microprocessor 130 such as a basic stamp controller, a programmable logic controller, a personal computer, or other similar device capable of executing various commands dependent upon certain inputs. The seat sensors 50 preferably comprise common mechanical-type contact closure devices similar to those utilized in many automobile systems; however, it is understood that other types of mechanical and electronic switches and sensors may be provided such as, but not limited to: transducers, heat sensing, ultrasonic, and the like, while providing equal benefit and function and as such should not be interpreted as a limiting factor of the invention 10. Said sensors 50 provide various "closed" and "open" signals routed therethrough the interconnecting cabling 60 and collected by a signal shaping circuit 135 which take said signals and convert them to a suitable resultant signal that can be used by the microprocessor 130. Additional input signals are provided therefrom a keyboard 100 to the microprocessor 130. In a similar manner, output signals are provided from the microprocessor 130 to the electronic display screen 105. Output signals are also provided from the microprocessor 130 to a light driver circuit 140 which controls the application of power to the array of indicator lights 70. As noted previously, a number and arrangement of seat sensors 50 would match that of the indicator lights 70 for any one particular multi-passenger vehicle 15. An output signal is provided from the microprocessor 130 to the acknowledgment indicator light 85, denial indicator light 90, and alarm 46 as well. An input signal is provided from the card reader 80 to the microprocessor 130. Finally, a bi-directional communication path 145 carries electrical signals between the microprocessor 130 and transceiver modem 150. The external antenna 45 is connected to the transceiver modem 150 by the transmitter cable 40. In such a manner, the system 10 can be controlled from a remote location and/or data read, thereby verifying that all passengers are properly seated or removed from the multi-passenger vehicle 15.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention is envisioned to be installed therein a multi-passenger vehicle 15 by a skilled automotive electrical technician and can be utilized by the common user in a simple and effortless manner following normal operational training. After initial purchase or acquisition of the system 10, it would be installed as indicated in FIG. 1.

The method of installing the system 10 may be achieved by performing the following steps: installing the seat sensors 50 thereto each passenger seat 55; routing the interconnecting cabling 60 discreetly within a floor surface and through the pedestal 25; anchoring the pedestal 25 thereto a floor portion of the multi-passenger vehicle 15 adjacent thereto the operator 160 using the mounting plate 110 and provided fasteners 22; routing and connecting the power cable 35 thereto a suitable power source therewithin the existing electrical system of the multi-passenger vehicle 15; connecting the transmitter cable 40 thereto the external antenna 45; mounting the control cabinet 20 thereto the pedestal 25 by pulling the handle 29 outwardly; inserting the mounting post 21 thereinto a top opening of said pedestal 25; pivoting the control cabinet 20 thereto a desired viewing angle; releasing the handle 29, thereby engaging the locking pin 27 thereinto an adjacent locking aperture 23; connecting the extension cable 32 thereto the first 30 and second 31 connectors; pressing the ON/OFF switch 95 to energize the system 10.

The method of utilizing the system 10 may be achieved by performing the following steps: allowing passengers to enter the multi-passenger vehicle 15 in a normal manner; directing each passenger to insert an electronically readable ID card 82 in the card reader 80, thereby transferring preprogrammed data including the passenger's name, address, seat assignment, and other critical information dependent on the specific application of the seat system 10; directing each passenger to then progress to an assigned seat 55 and sit down; responding to discrepancies in any child's location as indicated by the denial light 90 and alarm 46 alerting the bus operator 160 to check a corresponding seat location 55; responding also to said denial light 90 and/or alarm 46 should at any time during a trip onboard the multi-passenger vehicle 15, a passenger gets up from his or her passenger seat 55 and exceeds an allowable time delay; responding also to said denial light 90 and/or alarm 46 such as in the case of a child being skipped over when scheduled to be dropped off; directing each passenger to insert their ID card 82 in the card reader 80 as they exit the multi-passenger vehicle 15, thereby updating associated passenger status data; and, benefiting from securely monitored occupancy of seated children on school buses or other multi-passenger vehicles 15 using the present invention 10.

Should electronic ID cards 82 not be used, the keyboard 100 and electronic display screen 105 can be used to manually input passenger parameter data. In the case of a school bus, the system 10 serves as a supplemental warning system, in addition to visual verification, should a sleeping child be left behind. As previously described, the system 10 can be monitored remotely through use of the external antenna 45 should it be necessary.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A seat occupancy verification system for a motor vehicle, comprising:
    a plurality of sensors located on a portion of each of a plurality of passenger seats of said motor vehicle;
    a main control electrically connected therewith said plurality of sensors; and,
    a means of uploading a variety of programmable data thereto said main control, wherein said main control comprising a card reader; and further comprising a plurality of electronic identification cards insertable thereinto said card reader when entering and exiting said motor vehicle, thereby uploading said variety of programmable data;
    wherein said plurality of sensors provides information thereto said main control whether a passenger is present in each of said plurality of passenger seats; and,
    wherein said variety of programmable data allows a user to verify an identity of said passenger and a seat assignment and monitor a location of each said passenger.

2. The system of claim 1, wherein said means of uploading said variety of programmable data comprises a keyboard and an electronic display screen located thereon said main control, thereby providing said user a manual input means to upload said variety of programmable data thereto said main control.

3. The system of claim 1, wherein said system further comprises a transmitter cable electrically connecting said main control thereto an external antenna, thereby allowing said system to be controlled from a remote location.

4. The system of claim 3, wherein said main control receives a flow of electric power therefrom a plurality of power cables electrically connected thereto a battery of an onboard electrical system of said motor vehicle.

5. The system of claim 4, wherein said plurality of sensors are each electrically connected thereto said main control by a plurality of interconnecting cables.

6. The system of claim 5, wherein said system further comprises:
    a first connector for routing said transmitter cable, said plurality of power cables, and said plurality of interconnecting cables therethrough;
    a second connector connected to said main control;
    an extension cable electrically connecting said first connector therewith said second connector;
    wherein said first connector, said second connector, and said extension cable allow said transmitter cable, said plurality of power cables, and said plurality of interconnecting cables to be easily connected and disconnected thereto said main control.

7. The system of claim 6, wherein said main control further comprises an on/off switch, thereby controlling said flow of electrical power thereto said system.

8. The system of claim 6, wherein said main control further comprises a microprocessor, thereby executing a variety of various commands dependent upon said variety of programmable data uploaded thereto said main control.

9. The system of claim 6, wherein said main control is approximately twenty-four (24) inches wide, twelve (12) inches high, and twelve (12) inches deep.

10. The system of claim 6, wherein said main control further comprises:
    a panel located on a first side surface of said main control comprising a plurality of indicator lights and a plurality of seat number labels corresponding directly thereto a particular arrangement of said plurality of passenger seats; and,
    a variety of indicator lights and an alarm, thereby providing an alerting means thereto said user if said location of said passenger is incorrect.

11. The system of claim 6, wherein said main control is removably attachable thereupon a pedestal mounted to a floor surface adjacent thereto an operator of said motor vehicle.

12. The system of claim 11, wherein said pedestal further comprises a handle, thereby allowing re-orientation or removal of said main control therefrom said pedestal.

13. The system of claim 11, wherein said main control is rotatably connected thereto said pedestal, thereby allowing said operator to select an effective viewing angle.

14. A method for installing a seat occupancy verification system for a motor vehicle, said method comprising the steps of:
    installing a plurality of sensors thereto each of a plurality of passenger seats of said motor vehicle;
    routing a plurality of interconnecting cables discreetly within or thereon a floor surface and through a pedestal;
    anchoring said pedestal thereto a floor portion of said motor vehicle adjacent thereto an operator using a mounting plate and provided fasteners;
    routing and connecting a plurality of power cables thereto a suitable power source therewithin an existing electrical system of said motor vehicle;
    connecting a transmitter cable thereto an external antenna;

mounting said main control thereto said pedestal by pulling a handle outwardly;

inserting a mounting post thereinto a top opening of said pedestal;

pivoting said main control thereto a desired viewing angle;

releasing said handle, thereby engaging a locking pin thereinto an adjacent locking aperture;

connecting an extension cable thereto a first connector and a second connector; and, pressing an ON/OFF switch to energize said system.

15. A method for utilizing a seat occupancy verification system for a motor vehicle, said method comprising the steps of:

providing said system, comprising:

a plurality of sensors located on a portion of each of a plurality of passenger seats of said motor vehicle;

a main control electrically connected therewith said plurality of sensors; and, a means of uploading a variety of programmable data thereto said main control;

wherein said plurality of sensors provides information thereto said main control whether a passenger is present in each of said plurality of passenger seats; and, wherein said variety of programmable data allows a user to verify an identity of said passenger and a seat assignment and monitor a location of each said passenger;

allowing passengers to enter said motor vehicle in a normal manner;

directing each passenger to insert an electronic identification card in a card reader, thereby transferring preprogrammed data including the passenger's name, address, seat assignment, and other critical information dependent on the specific application of said system;

directing each passenger to then progress to an assigned seat and sit down;

responding to discrepancies in any child's location as indicated by a denial light and an alarm alerting a motor vehicle operator to check a corresponding seat location;

responding also to said denial light and/or said alarm should at any time during a trip onboard said motor vehicle, a passenger gets up from his or her passenger seat and exceeds an allowable time delay;

responding also to said denial light and/or said alarm such as in the case of a child being skipped over when scheduled to be dropped off;

directing each passenger to insert their said electronic identification card therein said card reader as they exit said motor vehicle, thereby updating associated passenger status data; and, benefiting from securely monitored occupancy of seated children on school buses or other said motor vehicles using said system.

16. The method of claim 15, further comprising the steps of:

using a keyboard and an electronic display screen manually to input passenger parameter data should said electronic identification card not be used;

utilizing an external antenna to remotely monitor said system if necessary; and, using said system in addition to visual verification to monitor if any children are left behind, if said motor vehicle is a school bus.

\* \* \* \* \*